Jan. 29, 1952 W. H. EVANS 2,584,005
LINE REAMING AND BORING MACHINE
Filed Feb. 1, 1950 4 Sheets-Sheet 1
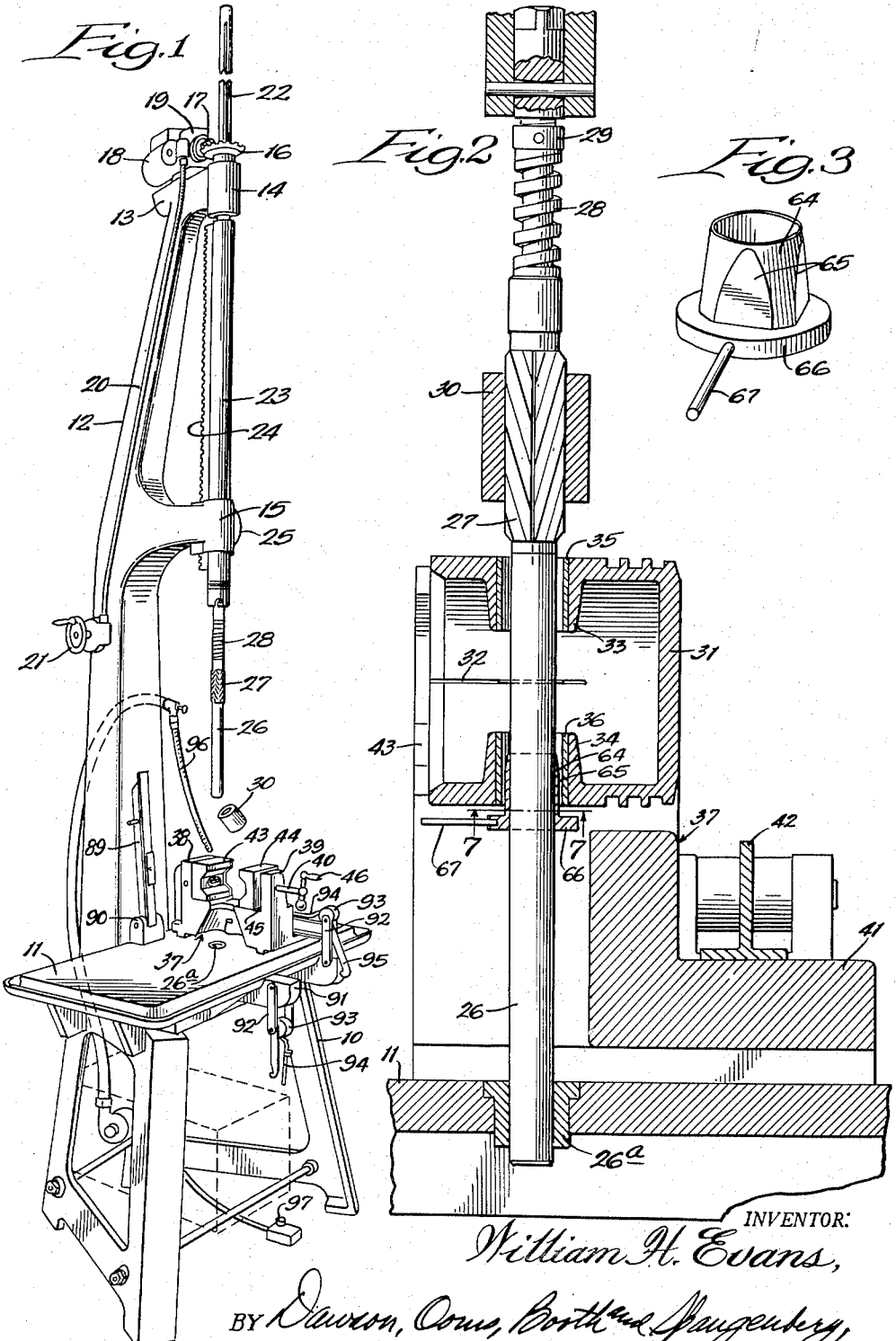

Jan. 29, 1952 W. H. EVANS 2,584,005
LINE REAMING AND BORING MACHINE
Filed Feb. 1, 1950 4 Sheets-Sheet 2
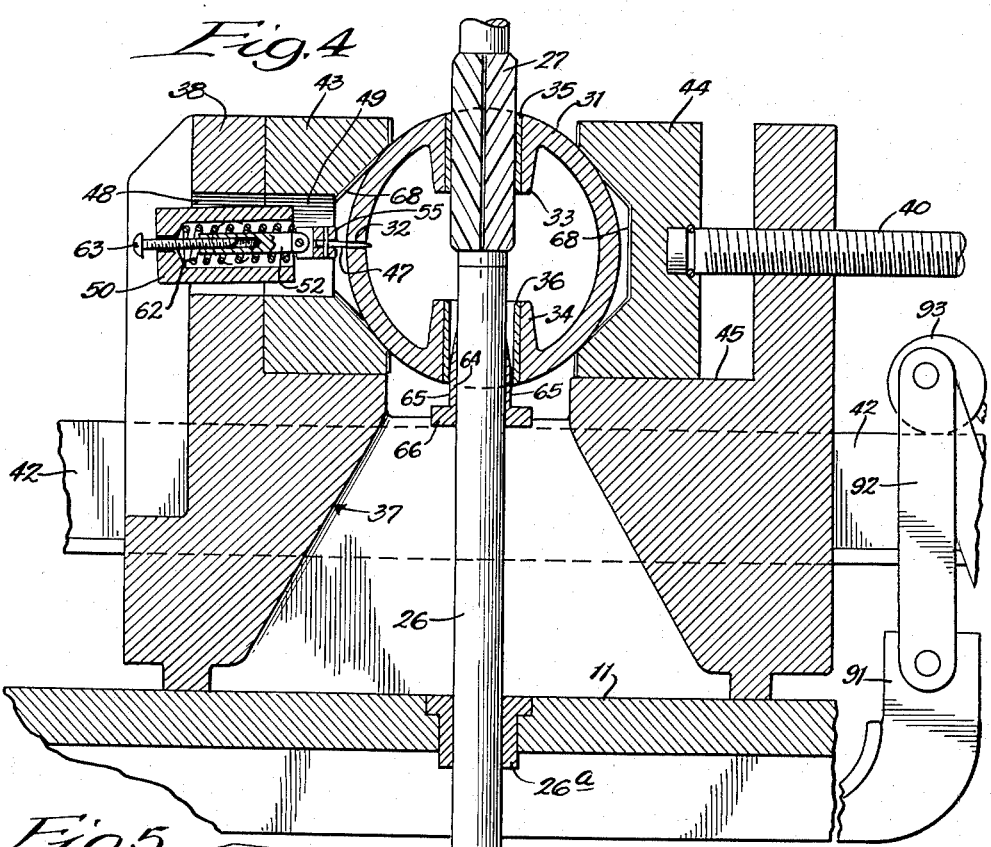
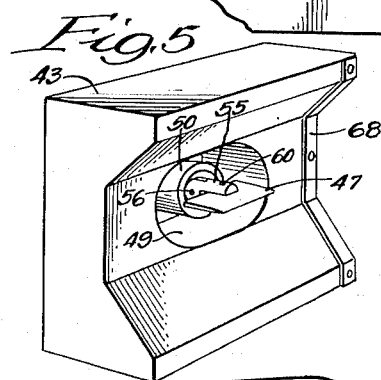
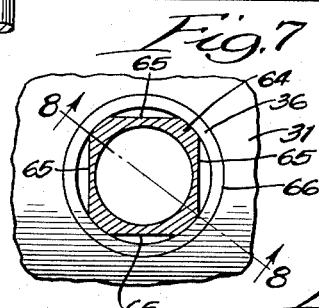
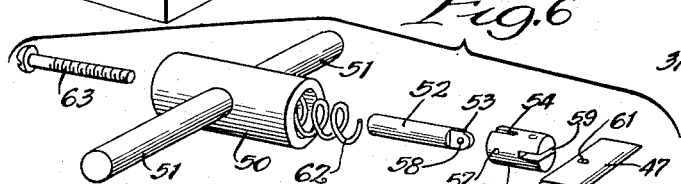
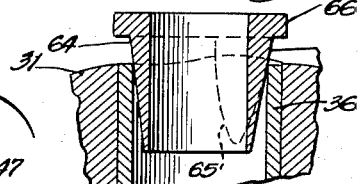
INVENTOR:
William H. Evans,
BY Dawson, Ooms, Booth and Spangenberg,
ATTORNEYS.

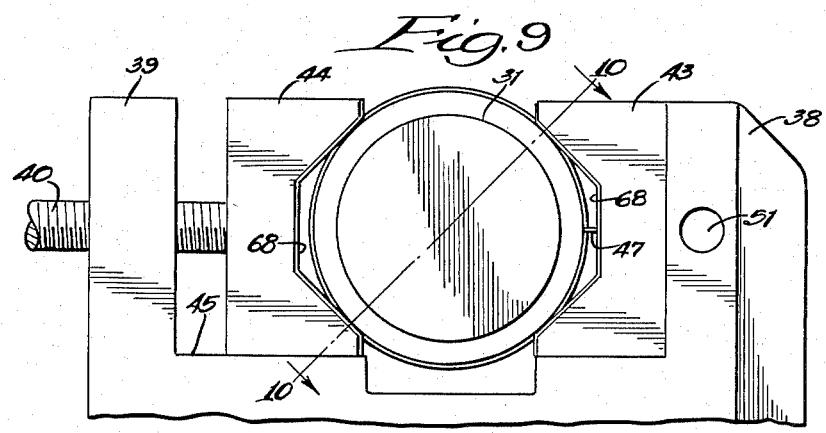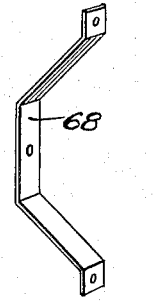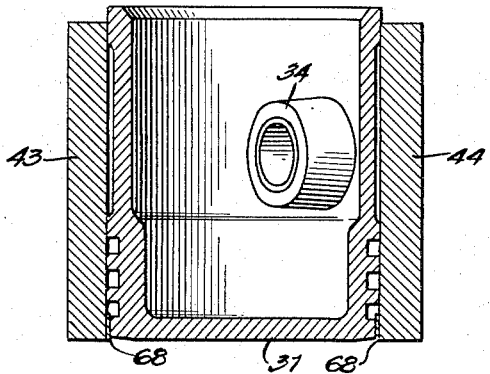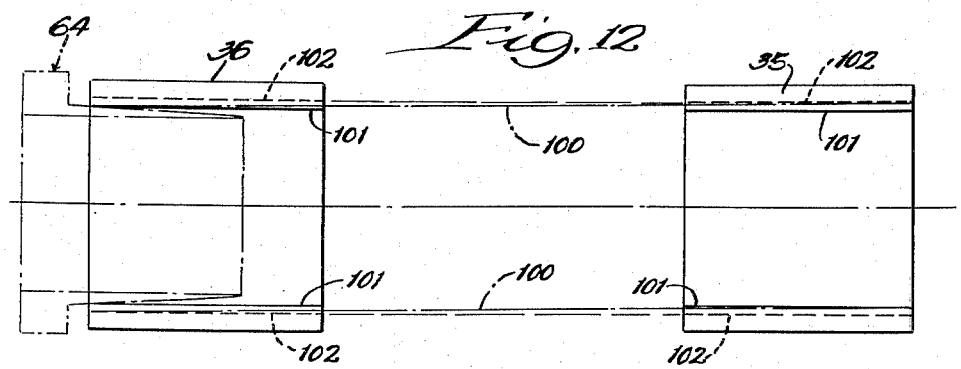

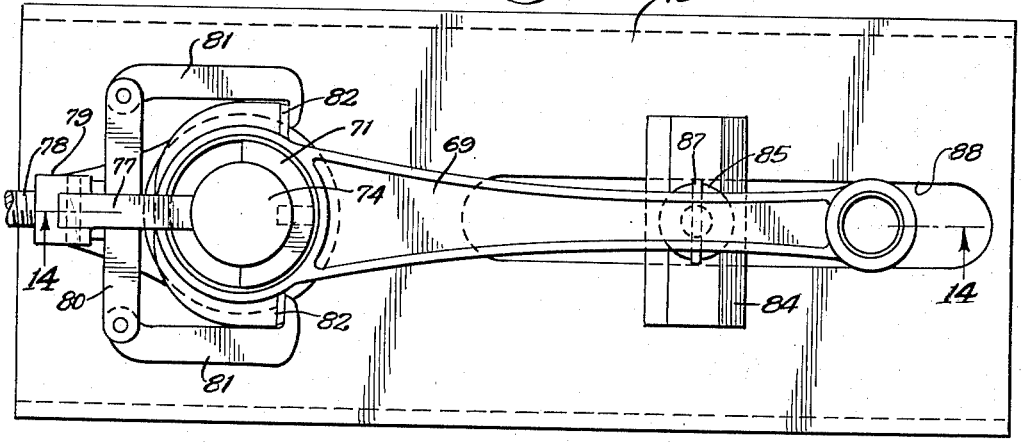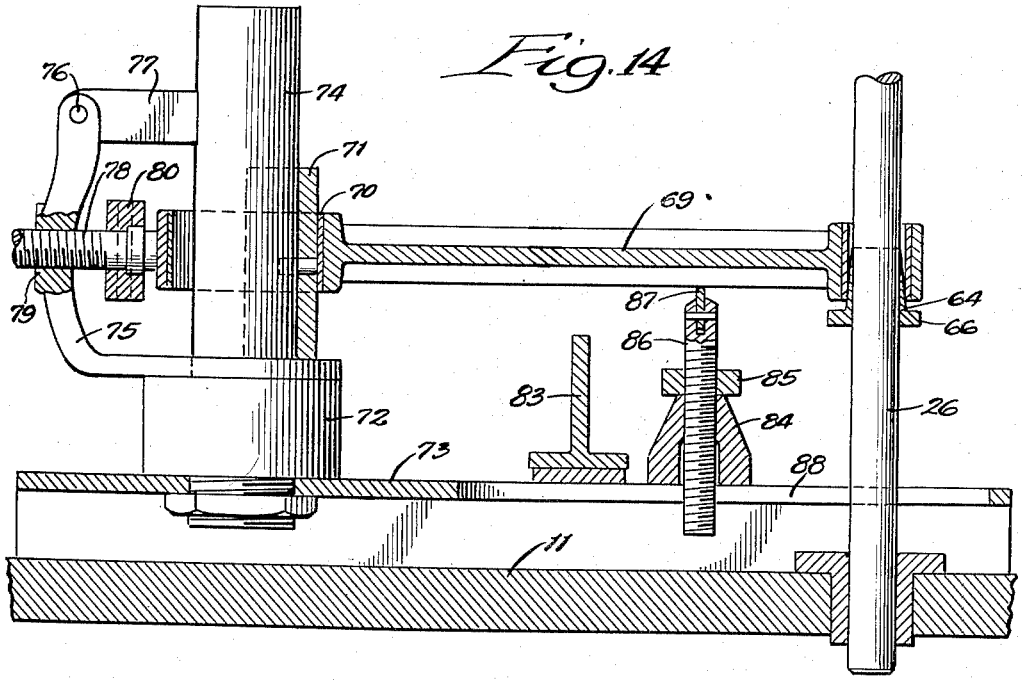

Patented Jan. 29, 1952

2,584,005

UNITED STATES PATENT OFFICE 2,584,005

LINE REAMING AND BORING MACHINE

William H. Evans, Chicago, Ill.

Application February 1, 1950, Serial No. 141,809

4 Claims. (Cl. 77—63)

This invention relates to reaming and boring apparatus and is particularly useful in the reaming of automobile piston and connecting rod bearings.

In the overhauling of internal combustion engines, it is usually necessary to replace or repair the upper connecting rod bearings and in this connection it is common to replace wrist-pins which are 3 or 5/1000ths oversize. In this operation it is necessary to ream the bearings in the piston in which the wrist-pin is supported as well as the upper connecting rod bearing which engages the central portion of the wrist-pin.

The bearings in the piston bosses require accurate reaming because they are frequently elongated as a result of the reciprocating vertical rod, and the connecting rod bearings are not only elongated but frequently are distorted due to a twisting of the connecting rod itself. Such twisting is caused by the reduction of strain in the metal itself.

In rebuilding operations of the type discussed, the pistons are frequently reamed in such a way that the holes on the two sides of the skirt are not in alignment. When the upper piston rod bearing is reamed by following the old opening and the wrist-pin is then fitted into the piston and upper connecting rod bearing, it is usually found that the main bearing at the bottom of the connecting rod is out of line with the connecting rod, and it is then necessary to twist and bend the connecting rod to obtain a proper alignment. As a result, the strain thus introduced into the connecting rod is relieved after some miles of operation and the piston is caused to bear more tightly against one side of the cylinder than the other, with the result that out-of-round cylinder bores and piston slap and other undesirable results follow.

Automobile factories spend large sums of money every year taking strains out of castings and metal before building automobile engines. Due to the need for high production, the time for such operations is limited and only about 80% of the strains are eliminated, the remaining 20% being released later in the operation of the engine when heating up and cooling off. During this latter operation, the connecting rod twists and tilts the pistons so that the rings are also tilted and wear barrel face to provide spaces through which oil may escape and also causing a reduction in compression.

In the practice described above of fitting oversized wrist-pins, it has been common to follow the old worn hole in the piston, then to put the rod in a straining fixture and test it to bend the rod back into line. However, within a few days the new strains created by such bending in attempting to straighten the rod begin to release and the rings of the piston no longer lie flat against the wall of the cylinder. Thus the same trouble starts over again.

Another difficulty presented grows out of the common practice of providing the piston with a split skirt or with a slot in the skirt. Aluminum pistons expand a great deal and the slot in the skirt of the piston has been found desirable for taking care of such expansion and construction due to heat changes. However, when the piston is placed in a fixture or support and reamed, a distortion of the piston bosses and bearings occurs due to the yielding character of the split skirt. Thus, for many years, unsatisfactory reaming operations upon pistons have resulted and no one up to the present time has suggested any means for overcoming this difficulty.

An object of the present invention is to provide reaming apparatus in which pistons may be accurately reamed without causing a distortion of the bearing portions being reamed due to the slot in the skirt of the piston. Yet another object is to provide reaming apparatus by which pistons, etc. are accurately secured in position for reaming and by which the reaming for both holes is accomplished in a minimum of time. A still further object is to provide means for accurately centering the piston with respect to the reamer shaft while at the same time supporting the piston in such a manner as to prevent distortion of the piston skirt. Yet another object is to provide novel centering means for pistons, connecting rod bearings, etc., by which the bearings of such structures are accurately centered with the reamer shaft prior to the reaming operation and in a minimum of time.

A still further object is to provide reaming apparatus which occupies little space while at the same time providing a vertically-supported reamer shaft which is guided in a horizontal bed therebelow. A still further object is to provide compact and sturdy apparatus for the reaming of pistons and connecting rod bearings while providing accurate means for supporting the parts being reamed and enabling the reaming operation to be carried on in a minimum of time. Other specific objects and advantages will appear as the specification proceeds.

The invention is shown in an illustrative embodiment by the accompanying drawings, in which:

Fig. 1 is a perspective view of apparatus embodying my invention; Fig. 2, an enlarged vertical sectional view showing a piston secured in position for reaming; Fig. 3, a perspective view of a centering bushing or tapered guide which I prefer to employ; Fig. 4, an enlarged vertical sectional view of the work holder, the section being taken transversely of the piston held by the work holder; Fig. 5, an enlarged perspective view of a clamping block equipped with a wedge for engaging the split of the piston skirt; Fig. 6, a developed view of the wedge and supporting structure therefor, the parts being shown in separate relation; Fig. 7, a transverse sectional view, the section being taken as indicated at line 7—7 of Fig. 2; Fig. 8, a broken sectional detail view, the section being taken as indicated at line 8—8 of Fig. 7; Fig. 9, a broken enlarged end-view of the work holder equipped with a shim which engages an end-portion of the piston; Fig. 10, a sectional detail view, the section being taken as indicated at line 10—10 of Fig. 9; Fig. 11, a perspective view of one of the shims employed; Fig. 12, a side view in elevation of the bearings of the piston, the bearings being shown in the aligned position which they occupy in the piston, and dotted lines being provided to show the wear line of the used bearings, and also the new bore line after the reaming operation in the apparatus shown; Fig. 13, a plan view of the support apparatus used for supporting the connecting rod; and Fig. 14, a longitudinal sectional view, the section being taken as indicated at line 14—14 of Fig. 13.

In the illustration given, 10 designates a frame which may be of any suitable construction, and upon which is supported a bed 11. Extending above the bed 11 is a standard 12 providing at its top a motor mounting 13. The standard 12 provides at its upper end a sleeve bearing 14 and at an intermediate point below a sleeve bearing 15.

Within the bearings 14 and 15 is supported reamer apparatus which may be of any suitable type or construction. In the specific illustration given I provide a reamer shaft equipped with a reamer, means for rotating the reamer shaft, and means for raising and lowering the reamer shaft. Mounted within bearing 14 is a gear-equipped sleeve 16 and the gear thereof meshes with a motor-driven gear 17. The gear 17 is driven by motor 18 through reduction gears housed within casing 19. The reduction gears are preferably of the chain speed type and the relative speeds may be changed by a manually-operated element within the tubing 20 and controlled by the hand-operated wheel 21 which is placed at a convenient point upon the standard 12 for operation by the operator. The relative speeds may be changed from 0 to 180 or other desired ratios.

Keyed to the gear sleeve 16 is a reamer shaft 22 so that the shaft 22 is rotated with the gear sleeve 16 while being vertically movable relative thereto.

To raise and lower the reamer shaft, I provide a rack sleeve 23 which is slidably mounted within bearing 15, shaft 22 being rotatably anchored to the sleeve 23 for vertical movement therewith while rotating independently thereof. The rack 24 of the sleeve 23 is engaged by a gear operated by a manually-operated wheel 25. Since such means is well known in the art, a further detailed description is believed unnecessary.

The lower portion of the reamer shaft 22 is provided with a smooth extension 26 adapted to extend through a bearing 26ª in the bed 11, as shown more clearly in Fig. 2. Above the smooth extension is a reamer 27 which may be of any suitable type or construction. If desired, a reamer of the type described in detail in my Patent No. 2,421,490 may be employed. The reamer is backed by a compression spring 28 above which I prefer to place an adjustment nut 29. A reamer gage 30 may be slipped over the smooth extension 26 and about the reamer 27, as shown in Figs. 1 and 2, in order to insure a reamer of the desired diameter; however, the gauge 30 is removed from the reamer prior to the reaming operation.

A typical piston is indicated by the numeral 31 and the skirt of the piston is shown provided with the slot or split 32. As indicated more clearly in Fig. 2, the upper and lower bosses 33 and 34 of the piston are shown and within the bosses are the bearings 35 and 36.

In order to support the piston accurately, I provide a work holder 37 which may consist of a single member providing a vertical recess through which the reamer shaft may extend. In the specific illustration given, I provide a casting providing on one side a vertical wall 38 and on the other side a standard or wall 39 provided with a threaded aperture for receiving screw 40. The member 37 may be provided on one side with an extension 41, which in the illustration given in Figs. 1 and 2 is engaged by a clamp 42. In actual operation, I prefer to omit use of the clamp for the reasons hereafter set out.

A V or notched block 43 is mounted upon the base portion of the member 37 and against the wall 38. A similar block 44 having a notched or V front surface is slidably mounted upon a shelf 45 adjacent the wall 39 and is secured to the actuating screw 40. The screw 40 may be pro- operation, I prefer to omit use of the clamp for 40.

I prefer to equip the work holder with a wedge 47 for engagement with the slot or split 32 in the skirt of the piston 31, as shown more clearly in Fig. 4. Since the pistons vary in size, is it essential that the wedge be supported for movement inwardly and outwardly so as to accommodate itself to such different piston sizes. Further, in view of the fact that slots in the skirts of the pistons are not always located at the same points, it is important that the wedge be supported for angular movement so as to accommodate itself to the different positions of the slots. In short, the wedge should be supported on a universal mounting permitting the wedge to squarely engage the slots regardless of their positions in the piston skirts. I prefer also to taper the wedge so that when it is urged inwardly it will tend to fill the entire space of the slot and thus in effect provide a solid skirt wall for the period in which the reaming is carried on.

In the specific illustration given, I provide the wall 38 with an opening or passage 48 extending therethrough and similarly I provide the block 43 with a passage 49 aligned with passage 48. Mounted within the passages 48 and 49 is a plunger casing 50 equipped with laterally-extending pins 51. The pins 51 enter side recesses in the wall 38 so as to provide a pivotal support for the plunger casing 50. Within the casing 50 is a plunger 52 having an apertured tongue 53 at its forward end engaging a slot 54 in the head 55. A pivot pin 56 extends through transverse openings 57 in the head 55 and transverse opening 58 in the tongue 53 so that the head 55 is thus pivotally supported upon the plunger 52.

The head 55 is provided at its forward end with a transverse or horizontal slot 59 for receiving the rear edge portion of the wedge 47. A pin 60 extends downwardly through an opening in the front forward end portion of the head 55 and through an opening 61 in the wedge 47. Thus the wedge 47 is pivotally mounted upon the head 55 so as to swing in a horizontal plane thereon. A spring 62 is carried within the plunger casing 50 and normally urges the head 55 in an inner direction so as to bring the wedge within the slot 32 of the piston 31. To limit the plunger 52 and head 55 from extreme inward movement, when the piston is not in place, I provide a headed screw 63 having its inner end threadedly engaging a recess at the rear of plunger 52, as shown more clearly in Fig. 4.

With the supporting structure above described, the wedge 47 is normally urged inwardly so as to engage the split or slot in a piston, no matter what its size, while at the same time the wedge is movable through angles enabling it to conform to the slots however they are positioned within the piston skirt.

In positioning the piston or connecting rod bearing with respect to the reamer shaft, it is important that guide means be employed which have sufficient bearing points to enable such positioning to be accurate to the highest degree. To bring about this result, I prefer to employ a hollow bushing or tapered collar 64, as illustrated more clearly in Figs. 2, 3, 7 and 8. The bushing is of a diameter permitting it to make a firm sliding contact with the lower end portion 26 of the reamer shaft. The side walls of the tapered portion are preferably cut away to form oppositely-disposed flattened portions 65. The bushing also includes a disk portion 66 to which is connected a guide pin 67. With this structure, there is provided a four-point contact between the tapered bushing 64 and the bearing 36 of the piston 31, as illustrated best in Figs. 7 and 8. Thus inaccurate positioning as might be occasioned by having single-point contacts is eliminated and by virtue of the four-point contacts provided I find that extremely accurate positioning of the piston with respect to the reamer shaft is obtained. This is also effective in positioning the connecting rod with respect to the reamer shaft.

After the piston, for example, has been accurately positioned with respect to the reamer shaft, the actuating screw 40 is rotated to bring the clamping block 44 against the piston 31 to anchor it in the selected position, as illustrated in Fig. 4. It is important to have a multi-point contact between the centering bushing 64 and the bearing to center an egg-shape hole formed by wearing. The bushing may have four-point contact, eight-point contact or any suitable number of contacts.

I prefer to equip the blocks 43 and 44 of the work holder, along one edge thereof, with shims 68, as shown more clearly in Figs. 9, 10 and 11. The shims take care of the reduced diameter of the top end of the piston, as illustrated more clearly in Fig. 10.

The connecting rod 69 may be supported upon the bed 11 by any suitable means. In the illustration given in Figs. 13 and 14 the lower bearing 70 of the connecting rod is provided at its inner side with a semicircular bar 71 so as to strengthen the bearing portion during the ensuing clamping operation. A holder 72 is secured upon a base 73 and is equipped with an upwardly-extending post 74. A fixed arm 75 extends rearwardly of the member 72 and then upwardly and at its top is connected by pivot 76 to the abutment lug 77. An actuating screw 78 extends through a threaded boss 79 carried by the member 74 and on the actuating screw is mounted a cross-link member 80. The link member 80 is pivotally connected to draw arms 81 which have inwardly-turned forward portions engaging the shoulders 82 of the lower connecting rod portion. By this means, when the screw 78 is rotated by a handle (not shown) in one direction, the link 80 and draw arms 81 are drawn outwardly so as to pull the lower connecting rod tightly against the semicircular bar 71 which in turn bears against the post 74. By this means, the connecting rod is securely anchored in position. If desired, the base 73 carrying the above support may be clamped in position upon the bed 11 by use of the clamp 83.

To support the inner free end of the connecting rod near the point where it is engaged by the reamer, I prefer to employ a jack device or vertically adjustable support of the character illustrated in Figs. 13 and 14. A base 84 carries a rotatable threaded collar 85 in which is mounted a screw 86. The screw 86 near its top is preferably provided with a bearing plate 87 for engagement with the inner end portion of the connecting rod 69. In the illustration given, bearing plate 87 is pivotally connected to the top of screw 86 so that it can tilt to adjust to the inclination of the bottom of the connecting rod, and thereby provide a solid bearing surface. In addition, this tends to make screw 86 exert pressure toward the center of the connecting rod regardless of distortion of the rod, which assists in holding the wrist pin bearing parallel with the crank shaft bearing during the reaming operation. The base 73 is preferably slotted at 88 to permit longitudinal shifting of the jack structure thereon.

In the illustration given, I have shown clamps 42 and 83 which may be employed for securing the work holders upon the bed 11. Each of the clamps comprise cross-bars 89 which are pivotally mounted upon the standards 90 at the rear of the bed. At the forward ends of the bed are projections 91 upon which are pivotally mounted links 92. An eccentric roller 93 is rotatably mounted upon a pin carried by the links 92 and is also provided with a handle 94 which enables the clamping roller to be swung to clamping position and released positions, as best illustrated in Fig. 1. The link members 92 may be equipped also with a hook 95 for retaining the links in vertical position during the clamping operation, as illustrated in Fig. 1.

While I have shown and described the clamps, I prefer to carry on the reaming operations described without using the clamps and while permitting the work supports to float or move freely upon the bed 11. By thus permitting a floating action of the holders, I find that more accurate work is accomplished by the reamer since this freedom of movement of the holder enables it to accommodate the work readily to slight amplitude or lateral movements of the reamer. While the holder is thus floating, the centering bushing 64 is continuously held in position within the bearing by hand while reaming.

With relatively long reamers, there is a tendency for the reamer to run out five to ten thousandths of an inch in the center, causing a whip. If the reamer is sharp and it has to drag the work or jigs that have weight or friction on the bed, there is danger of the reamer cutting oversize. The less the friction and the more freedom of movement provided by the holder, the less the tendency of the reamer to cut oversize. Such floating action and freedom of movement are facilitated by anti-friction members, such as thrust bearings mounted between the work holder and the bed. Thus the work holder accommodates itself readily to slight amplitude or lateral movements of the reamer.

Cutting liquid for the reaming operation is preferably supplied through a tube 96 from any suitable source of supply and supported for directing the fluid at the desired point on the work. I prefer to have the valve of the fluid lane and the switch for the motor 18 both controlled by a single plunger 97 located for operation by the foot of the operator, as illustrated in Fig. 1. It will be understood, however, that other arrangements may be made for operation by the operator as desired.

Operation

In the reaming of a piston, the operator places the piston against the block 43 and with the slot 32 thereof in a position so as to be engaged by the wedge 47. The lower portion 26 of the reamer shaft is then brought into the position illustrated in Fig. 2 and the operator by the tips of his fingers holds the tapered bushing 64 in the position illustrated in Fig. 2 for centering the piston bearing with respect to the reamer shaft. After thus centering the piston, the handle 46 is manipulated by the other hand of the operator to bring the clamping block 44 tightly against the piston so as to locate it in the thus centered relation. The bushing 64 is then released and allowed to fall upon the bed 11. Thereupon the operator may depress the plunger 97 to start the motor and the flow of liquid upon the work. At the same time, he may lower the reamer by rotation of wheels 25 to bring the reamer through the bearing 35 at the top of the piston 31 and then the reaming operation is continued through the lower bearing 36. Thus, in a single reaming operation, both bearings of the piston are reamed and true alignment between the reamed holes is thus insured. No distortion of the bearings or bosses occurs because the wedge 47 fills the slot 32 in the piston skirt and makes the piston wall, in effect, a solid wall for the period of the reaming operation.

After the above reaming operation, the handle 46 is rotated in the opposite direction to release the piston from the clamping blocks and it is removed.

Similarly, the connecting rod 69 is centered with respect to its upper bearing and the lower portion 26 of the reamer shaft by the use of the tapered bushing 64, the operation being as already described in connection with the centering of the piston 31. Thereafter the reaming operation is carried through in the same manner as already described. In this operation, the supporting of the connecting rod by the jack structure provides a firm support for the rod near its point of reaming.

The reamer apparatus is extremely compact, taking up very little floor space while at the same time permitting more rapid and accurate reaming of pistons and connecting rods than has heretofore been possible. The filling of the slot in the piston during the reaming operation gives a degree of accuracy in the reaming operation never before attained, while at the same time the fitting of the wedge within the slot or split takes up a minimum of time.

As already described, it has been the practice heretofore in reaming used pistons to follow the old opening, the wrist-pin being later fit into the piston and then bent to obtain a proper alignment. In Fig. 12, the two bearings 35 are shown in a horizontally-aligned position which they would occupy when the piston supporting these is laid in a corresponding position. The wear line is indicated by the numeral 100. It will be noted that the wear line is inclined in each of the bearings and follows the dotted lines 100. The original lines of the bearings are as indicated by the numeral 101. By comparing this line with the inclined line 100, the tilting or inclusion of the wear line in one direction will be observed. In the use of the new apparatus I form a new ream line indicated by the dotted line 102. It will be noted that the new line 102 cuts out the surplus metal caused by the tilted wear line 100, and appearing more at one point of the bearing than at another so as to give a true cylindrical cut of greater diameter than, and parallel with, the original bore indicated by the lines 101.

When the oversize wrist-pin is then fit into the bearings provided with the new bore line 102, there is no misalignment and it is not necessary to twist or bend the connecting rod to obtain a proper alignment. Thus there is no strain introduced into the connecting rod so that wearing will have to occur in the relief of the strains. In fact, with my improved apparatus permitting the forming of the bore lines as described, there is less tendency for out-of-line wear to occur than with the original pistons, because strain has been largely eliminated from the metal of the pistons and bearings by reason of the long use thereof.

Through the use of the tapered bushing 64, with its oppositely-disposed flattened sides 65 giving a four-point contact or eight-point contact, an accurate positioning of the piston with respect to the reamer is obtained, as illustrated in Fig. 12, so that the true outer bore lines 102 may be accurately formed.

The present case is a continuation-in-part of my copending application Serial No. 94,610, for apparatus for reaming now abandoned.

While in the foregoing specification I have set forth a great deal of structure in considerable detail for the purpose of illustrating an embodiment of the invention, it will be understood that such details of structure may be varied widely by those skilled in the art without departing from the spirit of my invention.

I claim:

1. In a reaming apparatus, a work holder for supporting a piston having a slot in the skirt thereof, clamping means for securing said piston to said work holder including members for gripping the skirt of said piston, and a wedge attached to said work holder by members providing a universal mounting for said wedge to permit the positioning of said wedge squarely within the slot of said piston while securing said piston to said work holder, whereby the skirt of said piston is rendered solid and protected against being distorted by said clamping means substantially independent of the particular width and position of said slot.

2. In a reaming apparatus, a work holder having a notched block for engaging a piston having a slot in the skirt thereof, a second notched block slidably mounted on said work holder, means for urging said notched blocks together to clamp said piston therebetween with the inclined faces of said blocks bearing against the skirt of said piston, one of said blocks having an opening between the inclined faces thereof, a plunger within said opening mounted for inward and outward movement with respect to said piston, a wedge pivotally mounted on the outer end of said plunger for engaging the slot of said piston, and spring means urging said plunger outwardly to cause it to tightly engage the slot of said piston, whereby the skirt of said piston is rendered solid and protected against being distorted when clamped between said notched blocks substantially independent of the particular width and position of said slot.

3. The structure of claim 2 in which said notched blocks are equipped with oppositely-disposed shims secured to end portions thereof to compensate for the reduced diameter of the top of the piston.

4. In a reaming apparatus, a frame providing a horizontal bed, a work holder on said bed for supporting a piston having a slot in the skirt thereof, clamping means for securing said piston to said work holder including members for gripping the skirt of said piston, support members mounted upon said work holder for inward and outward movement with respect to the slot in the skirt of said piston, a wedge attached to the outermost of said support members for engaging the slot of said piston, said support members providing a universal mounting permitting the positioning of said wedge squarely within the slot of said piston while securing said piston to said work holder, and spring means urging said wedge outwardly into engagement with the slot of said piston, whereby the skirt of said piston is rendered solid and thereby protected against being distorted by said clamping means substantially independent of the particular width and position of said slot.

WILLIAM H. EVANS.

REFERENCES CITED

The following references are of record in the file of this patent:

UNITED STATES PATENTS

| Number    | Name         | Date          |
|-----------|--------------|---------------|
| 1,264,349 | Trundle      | Apr. 30, 1918 |
| 1,368,194 | Patman       | Feb. 8, 1921  |
| 1,462,742 | Davis et al. | July 24, 1923 |
| 1,473,245 | Miller       | Nov. 6, 1923  |
| 1,506,641 | Hunke et al. | Aug. 26, 1924 |
| 1,637,508 | Aab          | Aug. 2, 1927  |